United States Patent [19]
Barlow et al.

[11] Patent Number: 5,652,867
[45] Date of Patent: Jul. 29, 1997

[54] AIRLINE FLIGHT RESERVATION SYSTEM SIMULATOR FOR OPTIMIZING REVENUES

[75] Inventors: James Finlay Barlow, Southlake; Teresa Anna Maria Valdivieso; Anadi Gopal Risal, both of Arlington; Vijay R. Shah; Sandeep Gangadhar Parmekar, both of Fort Worth; Ramesh Venkata Perumal, Arlington, all of Tex.; Sarah Frances Davies, Wilmington, Del.; Jeffrey Alan Peterson, Grand Prairie, Tex.

[73] Assignee: Sabre Decision Technologies, A Division of The Sabre Group, Inc., DFW Airport, Tex.

[21] Appl. No.: 312,538

[22] Filed: Sep. 8, 1994

[51] Int. Cl.$^6$ .................................................. G06F 19/00
[52] U.S. Cl. .................... 395/500; 395/206; 395/601; 395/670
[58] Field of Search ........................ 395/500, 155, 395/600, 650; 364/407, 408, 401 R, DIG. 2

[56] References Cited

U.S. PATENT DOCUMENTS

| | | |
|---|---|---|
| 3,533,084 | 10/1970 | Cook et al. |
| 4,084,235 | 4/1978 | Hirtle et al. .................... 395/500 |
| 4,205,371 | 5/1980 | Feather ........................... 395/600 |
| 4,677,587 | 6/1987 | Zemany, Jr. ..................... 395/500 |
| 4,862,357 | 8/1989 | Ahlstrom et al. ................ 364/407 |
| 4,922,439 | 5/1990 | Greenblatt ....................... 364/407 |
| 4,926,362 | 5/1990 | Carns et al. ..................... 364/578 |
| 4,931,932 | 6/1990 | Dalmekoff et al. ............... 364/407 |
| 5,021,953 | 6/1991 | Webber et al. ................... 364/407 |
| 5,191,523 | 3/1993 | Whitesage ....................... 364/407 |
| 5,237,499 | 8/1993 | Garback .......................... 364/407 |
| 5,247,651 | 9/1993 | Clarisse ........................... 395/500 |
| 5,253,165 | 10/1993 | Leiseca et al. ................... 364/407 |
| 5,253,166 | 10/1993 | Dettelbach et al. ............... 364/407 |
| 5,414,809 | 5/1995 | Hogan et al. .................... 395/155 |

*Primary Examiner*—Kevin J. Teska
*Assistant Examiner*—Thai Phan
*Attorney, Agent, or Firm*—Warren & Perez

[57] ABSTRACT

A computerized airline flight reservation system simulator that allows air travel carriers to simulate changes in flight schedules and predict the impact of those changes on a carrier's revenue. The simulator includes means for the input of host and other airline scheduled flight information which is used to build a global network of flight services offered on existing central reservation systems (CRS). The network is built according to CRS build and edit rules and simulates the screen display of reservation systems according to CRS display and sorting rules. The system simulates the screen presence on existing CRSs allowing the airline to predict the revenues derived from its present flight schedule and provides means to make proposed changes in its schedule and correspondingly see how such changes may impact revenues.

8 Claims, 5 Drawing Sheets

AIRLINE FLIGHT RESERVATION SYSTEM SIMULATOR FOR OPTIMIZING REVENUES

TECHNICAL FIELD

The present invention relates in general to a computerized airline flight reservation system simulator and in particular to a system simulator that allows air carriers to simulate information seen on the central reservation system display screen in response to a customer flight request and thereby determine how changes in the carrier's flight schedule will impact the carrier's potential revenue.

BACKGROUND OF THE INVENTION

Historically, the sale of commercial passenger or cargo flight space is affected largely by the information seen on the display terminal of a Central Reservation System ("CRS"). The quantity and type of information describing an airline's flight services is known as the airline's screen presence. Screen presence is an important aspect of the flight reservation process since passenger demand is often influenced by the actions of travel agents, and travel agents are influenced in turn by the information appearing on a CRS screen.

For example, a travel agent will often sell flight services in the order in which they are displayed on the travel agent's reservation system screen. Thus, for a given customer request, flight services displayed first or near the top of the CRS screen display will often be sold before other services.

Screen presence is influenced by flight factors such as origin, destination, travel time, type of aircraft, number of stops, number of connecting points and costs. In a given market flights may be displayed in ascending order depending on overall travel time, number of connecting points and number of stops. Thus, changes in the flight factors will have an effect on the carrier's screen presence and correspondingly on its bookings in a given market.

Until the present invention, the airline carrier was unaware of the screen presence of its scheduled flights in a given market, as compared to the screen presence of its competitors. Where two or more flights would satisfy a particular consumer request, the CRS must determine which services and in what order to display them on the CRS screen. The selection, preference, and ranking of flight services depends primarily on established build, edit, sort, and display rules which vary from CRS to CRS.

Various systems have been proposed for managing the air space available on a carrier's scheduled flights or for tracking the availability of the carrier's flights. While many of these prior art systems allow consumers to contract and confirm reservations for scheduled and available flight space, these prior art systems do not provide the airline or travel agent a way to simulate the reservation process used in selling commercial flight space to the consumer. Furthermore, these prior art systems do not give the individual airline carrier a way to compare the screen presence of its scheduled flights to that of its competitors.

The ability to simulate the flight service request process by taking into consideration CRS flight service ranking rules, such as provided by the present invention, allows the travel provider to ascertain the screen presence of its scheduled flights and compare it to the screen presence of its competitors. This information gives the travel provider a decisive advantage and allows it to adjust flight factors to improve screen presence in a specific market, region, or an entire service market.

Furthermore, the ability to make changes in a carrier's scheduled flights and visualize how these changes impact the flight carrier's screen presence, allow it to determine how such changes effect the number of bookings in a given market. In this respect, the present invention provides the travel provider a way to visualize how changes in its scheduled flights will impact its potential revenues.

SUMMARY OF THE INVENTION

The present invention provides a computerized airline reservation system simulator that allows the air travel carrier to make changes in flight schedules and to predict the impact of such changes on the screen display information typically seen by the travel agent on any particular CRS display. This is accomplished by inputting the individual carrier's airline flight schedule along with all other airline schedules into the system and building a global network of all scheduled flights in all markets of interest. Additionally, display information comprising the display and edit rules for each individual CRS are used by the system of the present invention to evaluate how a given CRS displays requested flight information. Market parameters such as market size and the potential market revenues, which may be derived from past market history in a given market, are entered and used to relate the carrier's screen presence to the carrier's potential revenues.

The present invention also provides a computerized airline reservation system simulator allowing the airline carrier to incorporate the existing CRS flight ranking rules which impact the screen presence of the carrier's flights. In this respect, changes in the rules that effect the display of the carrier's scheduled flights are easily updated and incorporated in the schedule development process, thereby allowing the carrier to analyze the impact of such changes in the display of services and correspondingly determine the affect such changes will have on potential revenues.

The present invention also provides a CRS simulator that allows the travel carrier to calculate the total impact of a proposed change to its flight schedule on a flight carrier's overall revenue potential and screen presence goals.

Additionally, the present invention provides a CRS simulator that will evaluate the screen presence of a carrier's scheduled flights on a connection-by-connection basis. The present invention allows the air carrier to maximize revenues for a given flight based on the best screen presence for each connecting point in the flight. The airline carrier may then schedule a flight service comprising the most desired connecting points as requested by customers and thereby maximize its overall revenues along the entire flight path.

A primary advantage of the present invention is its ability to simulate the displays of all the major CRSs and to accommodate for the differences in display rules among them. In this respect, the present invention simulates the display information seen on the first line, first screen, as well as subsequent screen of a particular CRS display in response to a given customer request as seen by the travel agent.

Another advantage of the present invention is its ability to generate both single and double connection points to allow the travel carrier to account for connection points in its screen presence analysis for every origin and destination flight path from which it flies.

Yet another advantage of the present invention is its ability to analyze the screen presence and revenue potential of the travel provider's scheduled flights at different levels. The screen presence analysis can be performed for a given market or geographical region, by carrier or carrier type, by a particular reservation, or group of reservations, on a system or global-wide basis, or restricted entirely to a specific CRS.

Yet another advantage of the present invention is its ability to allow the air travel provider to automatically evaluate screen presence for its scheduled flights on a predetermined and user-defined periodic basis. This allows the airline carrier to simply enter changes in its flight schedule and have the system automatically perform the screen presence analysis on a one-day schedule, or a seven-day schedule, or any interval selected by the air travel provider that suits the airline's evaluation needs.

BRIEF DESCRIPTION OF THE DRAWINGS

Other aspects of the invention and its advantages may be appreciated with reference to the following detailed description taken in conjunction with the appended drawings in which.

DETAILED DESCRIPTION OF THE PREFERRED EMBODIMENT

Figure 1:
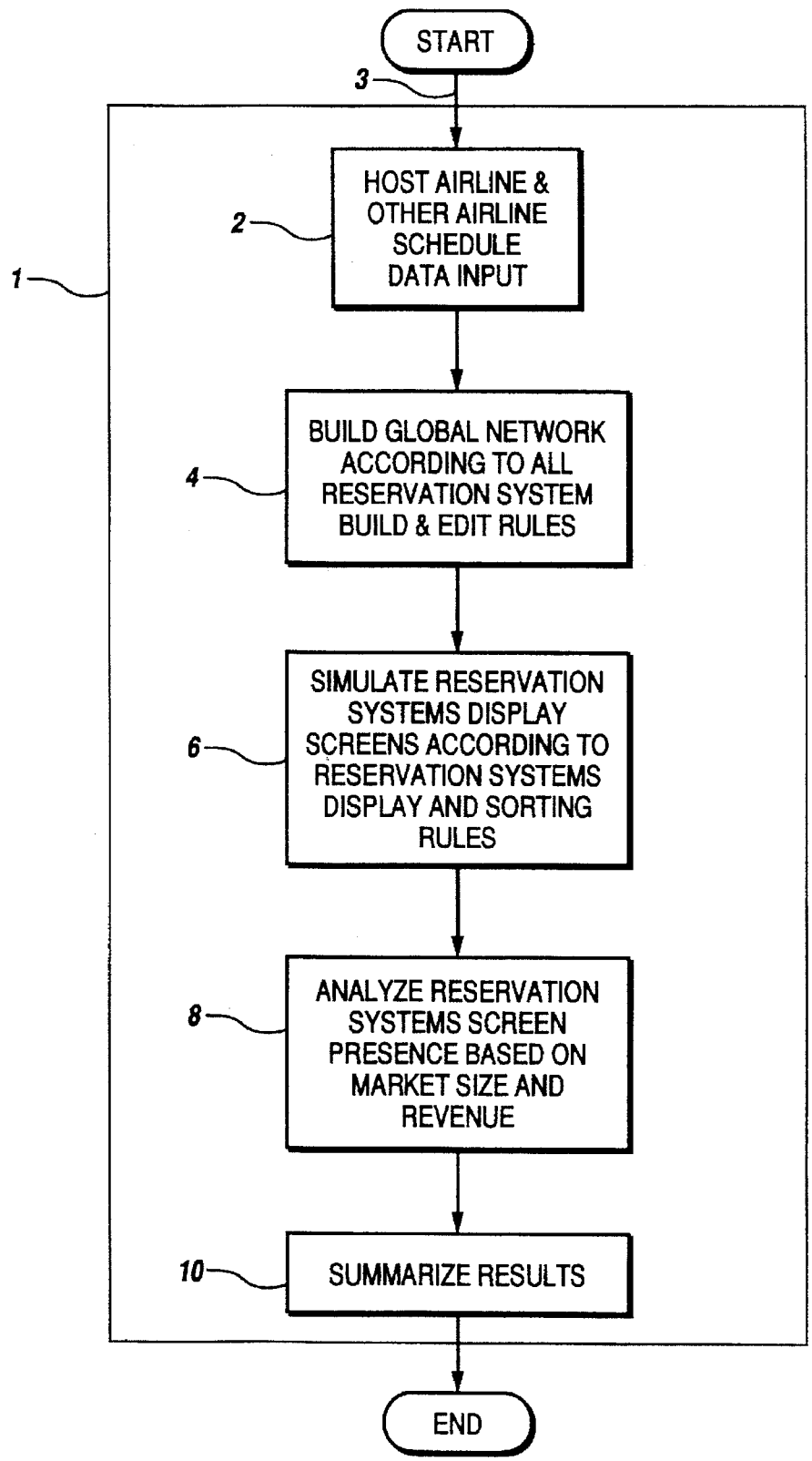
FIG. 1 is a block diagram representing one embodiment of the computerized central reservation system simulator of the present invention.

The present invention relates to a computerized airline flight reservation system simulator which can be used by an airline to maximize revenues. FIG. 1, a block diagram of the overall system 1, illustrates that means are provided for the input and storage of airline scheduled information 2 via input 3. Input 3 may be a data terminal unit, telecommunications line hookup, or any similar structure or apparatus that would facilitate input of the airline flight schedule data 2 into the system 1.

Host airline and other airline scheduled data 2 may consist of origin and destination information for flight services offered by the airline provider, display rules for each CRS, market share information, estimates of market size and revenues, frequency of requests for each request time, and the host airlines' share of bookings on a given CRS. The host airline and other airline scheduled information 2 may be stored, retrieved, manipulated, or otherwise arranged into any format suitable for processing by the system 1.

Part of the process flow for the system, is the building of a global network 4 using the host airline and other airline scheduled information 2 to build a worldwide database arrangement of travel services provided by travel providers in all markets of interest. The building of the global network 4 is done in accordance with CRS build and edit rules which may be input by the travel provider user via a data terminal unit, downloaded through telecommunications means, or obtained by other means which allow access to the CRS' particular constraints regulating the presentation and display of airline flight services.

Process flow in FIG. 1 is next directed to the step of simulating a CRS display screen 6 according to system display and sorting rules. The particular system display and sorting rules used in process 6 can be obtained through direct input on a data terminal, telecommunications line hookup, or any other similar method allowing access to the display and sorting constraints applicable on a given CRS.

Process flow in FIG. 1 continues to the analysis of the reservation system's screen 8 to determine the screen presence of the travel provider's flight services on the network of reservation systems. Analysis 8 is done accordingly, and influenced by the market size and revenue of the travel provider's services in a given market. A summary of results 10 is provided wherein the user may view the results on a screen display, hard copy output, or written to a file from the output of system 1.

While the process as described obtains a single set of results 10, it should be readily understood by one skilled in the art that input 3 would allow for the multiple modifications of host airline and schedule information to obtain an updated set of results 10.

Figure 2:
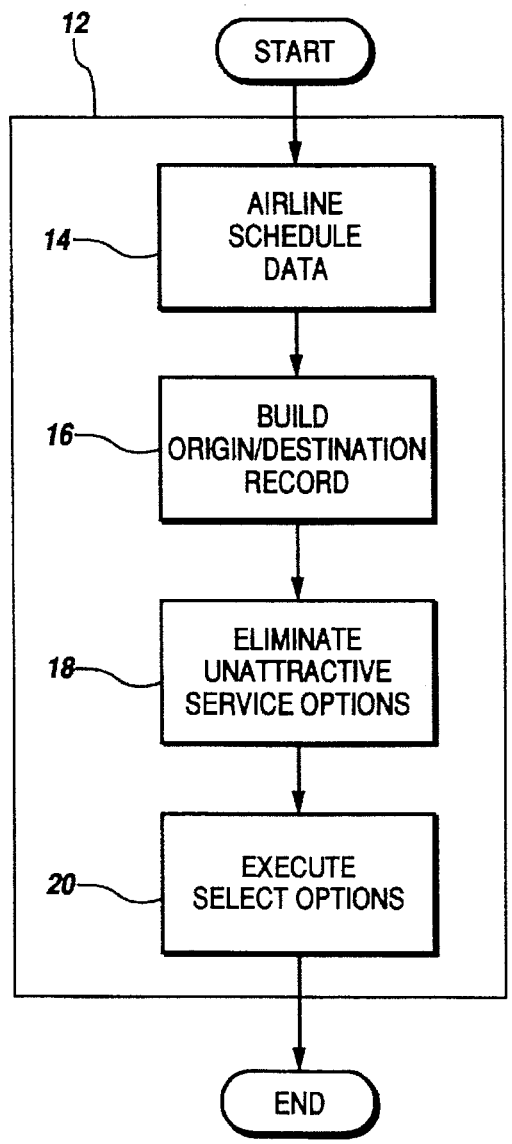
FIG. 2 is a block diagram of a global network generation process of the computerized central reservation system simulator of the present invention.

The process of building global network 4 is more readily understood by reference to FIG. 2. Generation process 12 initiates by obtaining airline schedule data 14 in order to build origin-destination record 16 containing all origin-destination data, including connecting points, for all flight services offered by airline travel providers in all markets of interest. While system 1 normally processes and performs screen simulation using all travel providers, service type and markets, to build origin-destination record 16, the user may optionally sort, pick, choose, or eliminate travel providers, service types, and markets in building origin-destination record 16 and selecting statistics therefrom.

Process is then directed to the elimination of any unattractive service options 18 which involves deleting unattractive services from the origin-destination record 16 whenever a superior service is available. The determination of whether a superior service is available is performed in accordance with CRS' specific edit and storing rules which determine which flight services will be displayed on a given CRS.

Process flow continues to the step of executing select options 20 to identify the potential flight services for sorting and display, given a particular flight service request. The manner and method in which select options are executed 20 may vary from CRS to CRS and is determined primarily by the particular CRS' sort and display rules.

Figure 3:
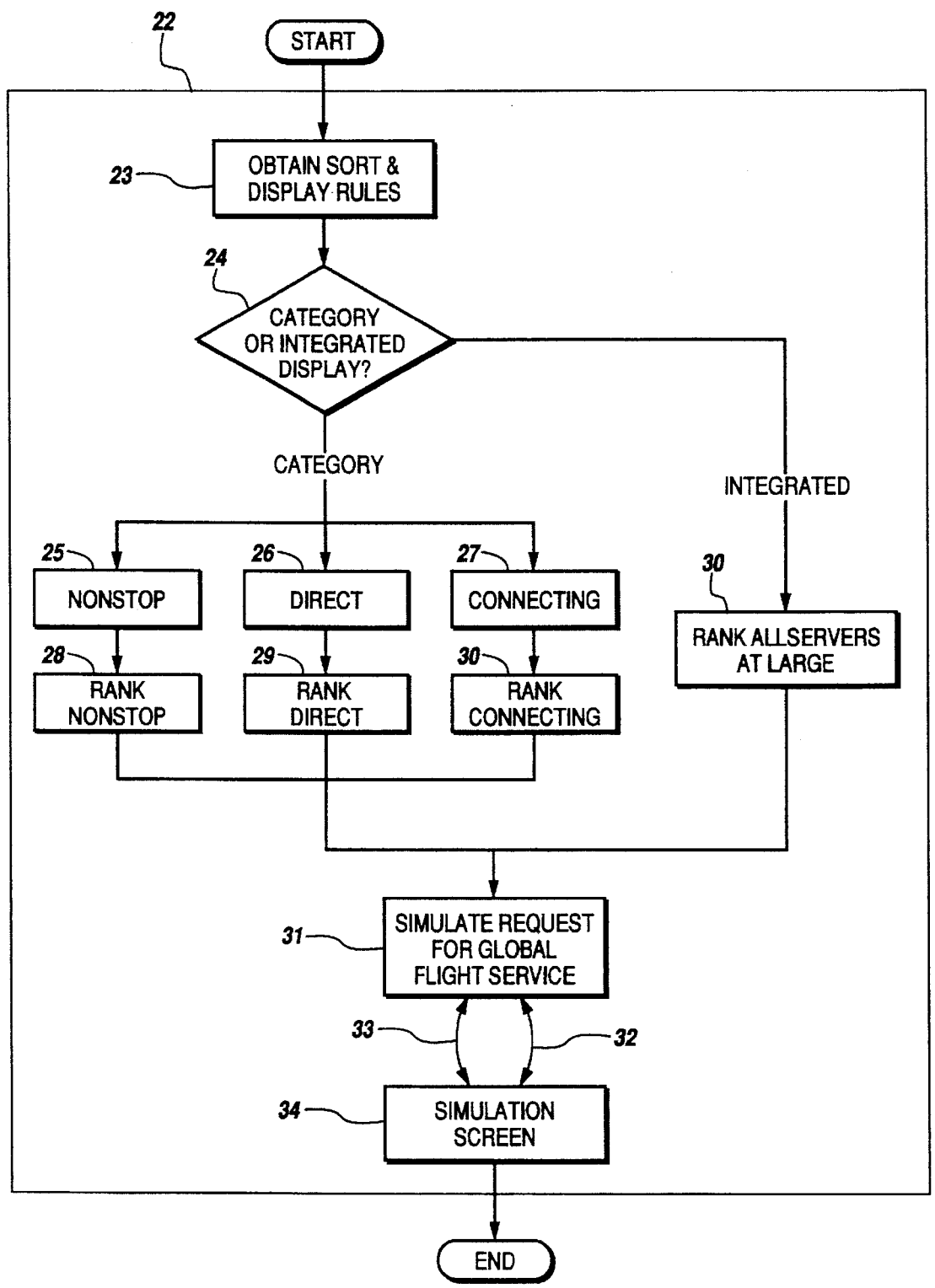
FIG. 3 is a block diagram of the screen simulation process of the computerized central reservation system simulator of the present invention.

The operation of the screen simulation process 6 of the present invention is more readily understood and comprehended by reference to FIG. 3. FIG. 3 is a block diagram of the screen simulation process 22 wherein the information displayed on various CRS screens as seen by the travel agent is reproduced and simulated. The screen simulation process 22 starts by obtaining individual sort and display rules 23 for each CRS. The sort and display rules and other constraints related to the display of flight services on the travel agent's CRS screen varies from system to system. The sort and display rules may be obtained by direct data input, through telecommunications line hookup, or through other equivalent means.

Screen simulation process 22 determines what type of CRS display to emulate. In the preferred embodiment of the present invention, process 22 determines whether to sort flight services by category or integrated display 24. For reservation systems using a category display, process flow is directed to a division of services into categories such as nonstop 25, direct 26, and connecting 27 flight services. Process flow continues with the ranking of services within each category 28, 29 and 30 respectively, according to factors such as displacement time, elapsed time, and the number of stops.

For the integrated display, screen simulation process 22 ranks all services on an at-large basis 30 for displacement time, elapsed time, number of stops, and other similar criteria used by existing CRS' to display integrated flight services to travel agents.

For either the category or integrated display of the screen simulation model 22, process flow continues to the step of simulating consumer service requests 31 using CRS sort and display rules 23. In the preferred embodiment of the present invention, twenty-four (24) requests are used for every market where the travel provider's flight services are offered, but any number of requests, as indicated by 32 and 33, can be used to simulate travel agent request activity on a reservation system.

Service request simulation step 31 creates simulation screens 34 for individual markets and request times. Screen simulation process 22 creates simulation screens 34 representing the display information obtained when service requests 32 are made for the travel provider's flight services in all markets of interest throughout the global network 4 and 12, and every service request 31, 32 and 33.

Figure 4:
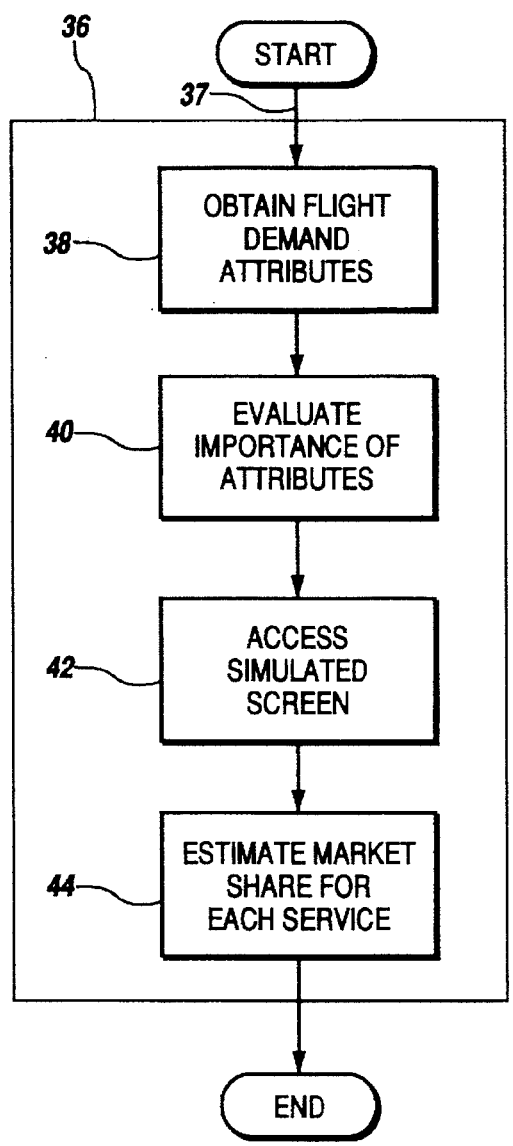
FIG. 4 is a block diagram of a market share process of the present computerized airline reservation system simulator.

The market share module of the present computerized airline reservation system simulator can better be understood with reference to FIG. 4. FIG. 4, a block diagram of a market share module 36, reveals that process flow begins by obtaining flight service information demand attributes 38 Via input means 37.

In the present invention, demand attributes 38 include the travel provider's screen presence, type of flight, departure time, elapsed time, aircraft type, and airline customer preference information. Process flow continues towards the valuation of the demand attributes 40 wherein the importance of each attribute is inferred from statistical analysis and other historical data. Valuation of demand attributes 40 involves the use of statistical analysis in order to create a realistic model of consumer and passenger demand for a given flight service in a given market.

Process flow is next directed to creating the simulated screen 42 by screen simulation module 22. The simulated screen 42 is created at every instance when the end-user needs to see the simulated screen 42. The screen simulator module 22 estimates market share for each offered flight service 44 by using the simulator screens 42 and calculates market share estimates for each individual flight service and each individual market by using valuation information 40.

Figure 5:
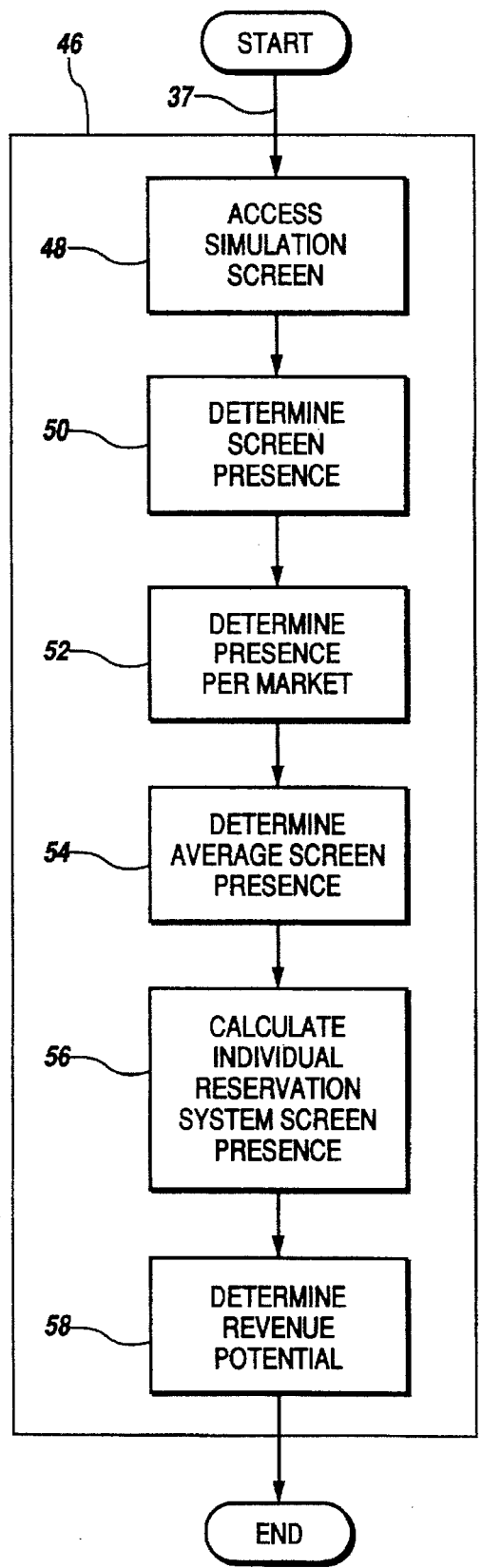
FIG. 5 is a block diagram of an analysis process of the present computerized reservation system simulator.

The analysis module of the present computerized airline reservation system simulator can be better understood with reference to FIG. 5. FIG. 5, a block diagram of the analysis module 46, illustrates that the analysis begins by recreating simulation screens 48 resulting from the screen file simulation module 22 and, in particular, step 34. The information in the simulated screens is summarized to determine the airline provider's screen presence in all markets 50. Screen presence per individual market is calculated 52, which allows the determination of average screen presence throughout all markets 54.

Screen presence per market 52 takes into account a time of date distribution in order to account for the differences in the frequency of consumer requests throughout the day. The average screen presence 54 takes into account the importance of a given flight service to the travel provider by considering the market size and average market revenue for a given flight service.

Analysis process 46 calculates the screen presence of flight services on a given CRS 56 using reservation system build, edit, sort, and display rules. Analysis process 46 determines the travel provider's revenue potential 58 in a given market, overall market, or combination of markets.

Figure 6:
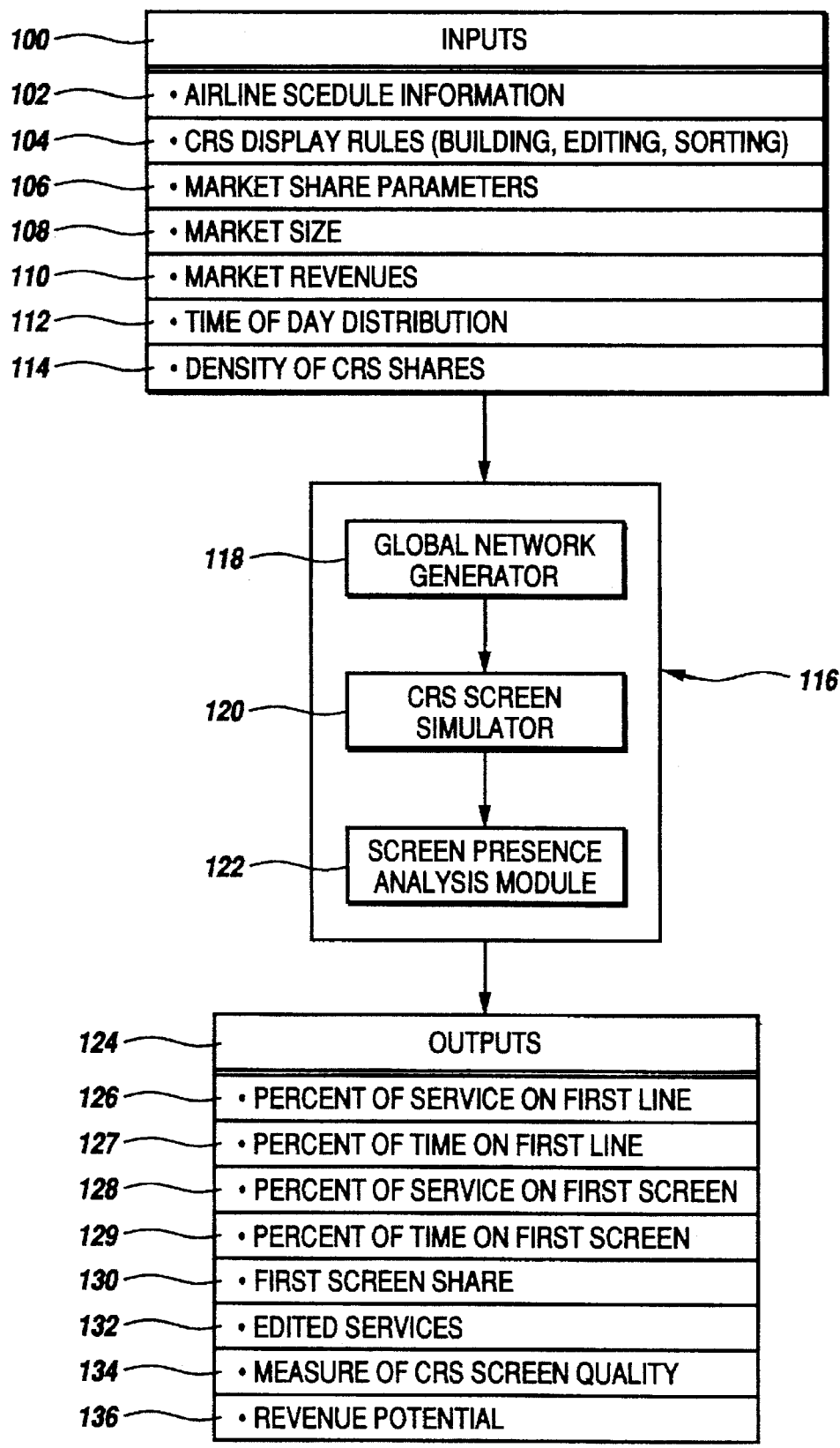
FIG. 6 illustrates the data inputs and outputs associated with operation of one of the preferred embodiments of the present invention.

FIG. 6 illustrates the data inputs and outputs associated with operation of the present airline flight reservation system simulator 1. Inputs 100 consists of airline schedule information 102 which contains origin and destination information for flight services in markets of interest. CRS display rules 104, comprising the CRS' building, editing, and sorting rules, are input into computer platform 116 and are used by screen simulator 120 to perform the screen presence calculations.

Market size parameters 106, market size 108 and market revenues 110, define the number of passengers traveling per week and the average fares paid by passengers by time of week. Time-of-day distribution 112 defines the frequency of customer requests for a given request time. Density of CRS shares 114 are estimates of sold flights in each market through each type of CRS.

Hardware platform 116 handles all the system processes and may be a personal computer, mini-computer or mainframe using inputs 100, 102, 104, 106, 108, 110, 112 and 114. Global network generator 118 performs the network building functions. CRS screen simulator 120 performs all the display emulation functions and works conjunctively with screen presence analysis module 122 to arrive at outputs 124, which in the preferred embodiment consists of statistical estimates of the travel provider's market screen presence and potential revenues.

System outputs 124 include the percent of flight services appearing on a CRS display's first line 126, the percent of time a carrier occupies the first line 127, CRS display first screen 128, the percent of time a carrier appears on the first screen, 129 and travel provider's share of first screen frequency 130 when compared with its competitors.

Edited services 132 provides a display of the flight services after application of CRS edit, sort build and display rules. The measure of CRS screen quality 134 compares screen presence of competing CRSs and quantifies the effect of CRS display rules on the travel provider's screen presence.

Revenue potential 136 is derived from market share parameters 106 such as market size 108 and market revenues 110 so as to quantify the travel providers revenue potential if no passengers were turned away and no limits in capacity existed.

In the detailed description of one of the preferred embodiments, reference is made to the appended drawings which form a part hereof and, in which, is shown by way of illustration, a single embodiment in which the invention may be practiced. It is to be understood that other embodiments may be utilized and changes may be made to both the method and structure without departing from the true scope of the present invention.

We claim:

1. A method of simulating the screen presence of an airline's flight services on existing central reservation systems comprising the steps of:

(a) obtaining airline flight schedule information;

(b) using the airline flight information to build a record of all flight services on an origin-destination basis;

(c) eliminating unattractive flight service options from the record;

(d) entering a customer request for a flight service;

(e) identifying potential flight services within the record which satisfy the customer request;

(f) simulating the display screen of the central reservation systems that appear in response to the customer request;

(g) storing the resultant displays in screen simulation files;

(h) analyzing the screen simulation files to determine the airline's services appearing on the first line of the screen displays;

(i) analyzing the screen simulation files to determine the airline's services appearing on the first screen of the screen displays;

(j) analyzing the screen simulation files to determine the percentage of time the airline's services appear on the first line of the screen displays; and (k) analyzing the screen simulation files to determine the percentage of time the airline's services appear on the first screen of the screen displays.

2. The method according to claim 1 wherein the step of simulating the display screen of the central reservation systems that appear in response to the customer request is performed using the particular system display and edit rules.

3. The method according to claim 1 wherein the step of using the airline flight information to build a record of all flight services on an origin-destination basis includes entering all connecting points for all flight services offered by airline travel providers in all markets of interest.

4. The method according to claim 1 wherein the step of simulating the display screen of the central reservation systems is performed by modeling a category display.

5. The method according to claim 4 wherein the category display contains a plurality of service divisions including nonstop, direct and connecting flight services which are ranked according to such factors such as displacement time, elapse time and number of stops.

6. The method according to claim 1 wherein the step of simulating the display screen of the central reservation systems is performed by modeling an integrated display.

7. The method according to claim 6 wherein the screen simulation process ranks all flight services on an at-large basis for displacement time, elapsed time, number of stops and other similar criteria used by existing central reservation systems to display integrated flight services to travel agents.

8. The method according to claim 1 further including the step of determining the screen presence of an airline's flight service per individual market by taking into account a time of date distribution to account for differences in the frequency of consumer flight requests throughout the day.

* * * * *